3,206,441
GRAFT COPOLYMERS OF STYRENE-POLYALKYL-ENE OXIDE CONTAINING POLYETHYLENE OXIDE UNITS USED AS REVERSIBLE EMULSIFIERS FOR VINYL POLYMERIZATION
Wulf von Bonin, Leverkusen, and Herbert Bartl, Cologne-Stammheim, Germany, assignors to Farbenfabriken Bayer Aktiengesellschaft, Leverkusen, Germany, a German corporation
No Drawing. Filed Sept. 4, 1962, Ser. No. 221,300
Claims priority, application Germany, Sept. 23, 1961, F 34,994
10 Claims. (Cl. 260—78.5)

The present invention relates to a process for polymerization in reversed emulsion resp. to polymeric materials prepared according to this process.

In U.S. patent specification Serial No. 114,658 a process for the production of polymers with a raised softening point has been described. Said process consists in that monomeric vinyl compounds, possibly in the presence of organic solvents which are immiscible with water, are emulsified with special emulsifiers which are capable of forming reversed emulsions to provide emulsions of the water-in-oil type and are polymerized with the aid of radical formers which are known per se.

The polymers prepared in this way are distinguished from the polymers of the same monomers prepared with the same activators by block, solution, or normal emulsion polymerization and of the oil-in-water type by a higher softening point. Since it is advantageous with this process if the reversal emulsifiers which are used can remain in the polymer it is desirable to use those reversal emulsifiers which have a highest possible efficiency as a reversely operating emulsifier, so that smallest possible quantities of this emulsifier are required. An additional aim is that the emulsification auxiliaries should have highest possible compatibility with the polymers.

It has now been found that graft-copolymers which can be obtained by polymerizing a styrene hydrocarbon in the presence of a water-soluble polyalkylene oxide containing polyethylene oxide units are especially suitable as reversed emulsifiers for polymerization of polymerizable vinyl monomers in reversed emulsion (i.e. emulsion of the water-in-oil type).

The preparation of the emulsifiers to be used according to the present invention is effected in a manner analogous to known graft polymerization procedures.

By styrene hydrocarbons there are understood styrene itself as well as styrenes alkylated in the aromatic nucleus or in the side-chain such as for example vinyl toluene, dimehyl styrenes p-ethyl styrene as well as α-methyl styrene. Of preferred interest within the scope of this invention are as graft monomers styrene and mixtures of styrene with said alkylated styrenes having a styrene content of at least 50% by weight, calculated on the total amount of the mixture.

As water-soluble polyalkylene oxides containing polyethylene oxide units it is preferred to use polyethylene oxides having a molecular weight of 300 to 200,000 and especially polyethylene oxides having a molecular weight from 1000 to 4000. However, water-soluble copolymers of polyethylene oxide can also be used advantageously, such as copolymers of propylene oxide and at least 80% by weight of ethylene oxide. The polyalkylene oxides are used in quantities of 10 to 500% by weight, and preferably 100 to 200% by weight, calculated on the amount of the graft monomer.

For the production of the emulsifiers, the polymerization of the components can be effected without or with the addition of inert solvents, i.e. solvents which do not interfere with the polymerization. Suitable solvents for this purpose are for example esters, such as ethyl acetate, butyl acetate, aromatic solvents, such as aromatic monocyclic hydrocarbons such as benzene, toluene as well as anisole, ketones and the like. It is preferred to use solvents which dissolve the monomer mixture but not the polymer and have no or only a slight chain terminating action, suc has tert. butanol. The solvents are advantageously used in quantities from 10 to 500% by weight, calculated on the polymerizable substance.

The catalysts employed for the graft polymerization advantageously are free-radical forming catalyst such as organic peroxides such as for example dibenzoyl peroxide, diacetyl peroxide, dilauroyl peroxide; azo compounds such as azodiisobutyric acid dinitrile or redox systems such as dibenzoyl-peroxide/benzoine. The catalysts are in this case advantageously used in quantities of 0.1 to 10% by weight, more especially 0.5 to 3% by weight calculated on polymerizable monomers. Furthermore activation by irradiation is to be considered.

Depending on the radical formers which are used, the polymerization temperatures are between 50 and 200° C., but preferably temperatures from 70 to 130° C. are chosen.

The process of the present invention is suitable for the production of reversed emulsions of the water-in-oil type of very different water-insoluble monomers containing at least one $CH_2=C<$ group. The present process is more especially to be considered for the production of reversed emulsions of compounds which represent members of the following group: aromatic vinyl compounds such as styrene, styrenes alkylated in the nucleus or side chains or divinyl benzene, esters of vinylalcohol with an aliphatic saturated monocarboxylic acid having from 2 to 4 carbon atoms, such as vinylacetate, vinylpropionate, etc., the esters of methacrylic acid, and acrylic acid with saturate monohydric alcohols containing from 1 to 6 carbon atoms such as ethyl methacrylate, ethyl acrylate, propyl acrylate or propyl methacrylate, butyl methacrylate and cyclohexyl methacrylate as well as the corresponding esters of acrylic acid, furthermore acrylonitrile.

The present process is of preferred interest for the production of polystyrene or polymers with a predominant styrene content since the present emulsifiers, more especially the graft polymers of styrene on polyethylene oxide, have a good compatibility with polystyrene in the concentrations necessary for the production of reversed emulsions.

It is of course also possible, for the production of cross-linked polymers, to polymerize the aforementioned monomers in the presence of from 0.05 to 90%, preferably 0.05 to 50% of other monomers carrying several olefinically unsaturated double bonds, for which the following are to be mentioned as examples: glycol dimethacrylate, triallyl cyanurate, triacrylyl-s-perhydrotriazine, trivinyl benzene. Furthermore, it is possible for the aforementioned vinyl monomers to be subjected to copolymerization with, for example, semi-esters of fumaric or maleic acids. Furthermore it is of course possible to polymerize the aforementioned monomers in admixture with one another.

One particular modification of the process according to the present invention consists for example in copolymerizing vinyl monomers having at least one polymerizable $CH_2=CH-$ grouping, preferably styrene with unsaturated polyesters containing polymerizable double bonds, more especially those of α,β-unsaturated dicarboxylic acids such as for example maleic acid and fumaric acid and at least dihydric alcohols such as ethylene glycol, diethylene glycol, triethylene glycol, 1,2- and 1,3-propanediol, 2,2-dimethyl propanediol, as well as polyhydric alcohols such as 1,1,1-trimethylol propans, glycerine and the like. The ratio between the polyester-copolymer components is within the usual limits in preparing copolymers of the alkyd resin type, i.a. normally a ratio between unsaturated polyester and vinyl monomer of between 9:1 to 1:9 is employed.

For carrying out the process according to the invention, first of all the reversal emulsifiers (and if required the polymerization initiator) is dissolved in the monomer to be polymerized. With steady stirring and if required with exclusion of air, the quantity of water to be incorporated into the emulsion and possibly containing the polymerization initiator, is introduced into the monomer, it being necessary to ensure that the water initially is added slowly or in portions, since otherwise in certain circumstances a reversed emulsion is not formed. On the other hand, with high water contents which are in the region of the stability limit of the reversed emulsion, stirring must not be carried out too vigorously, since the emulsion can otherwise be destroyed. The reversed emulsion has a creamy character and becomes more viscous with increasing water content, but generally is capable of being poured without being decomposed.

For the production of the reversed emulsion, the graft copolymers can be used in solvents, such as esters, perhaps ethyl acetate, in ethers such as diethyl ether or dioxane, in aromatic substances, such as benzene, chlorobenzene, or in alkyl halides, such as chloroform, or can be introduced as pure substance.

For the present process, the graft copolymers to be used as reversal emulsifiers are preferably introduced in quantities of 0.1 to 20%, advantageously 0.5 to 10% related on monomers (resp. an oil-phase if solvents are employed).

The reversed emulsion to be polymerized can contain 5 to 4,000%, preferably 200 to 2,000%, of water, based on the amount of the monomer. Said reversed emulsion is thinly liquid with small water contents and acquires a creamy to stiff consistency as the water content increases.

As initiators for the polymerization of the reversed emulsion, all radical formers or redox systems suitable for polymerization purposes can be used, both of the monomer-soluble and water-soluble type, for example radical-forming nitrogen compounds, such as azodiisobutyric acid dinitrile, peroxides especially acyl peroxides such as lauroyl peroxide, benzoyl peroxide, alkyl as well as dialkyl peroxides such as tert. butylhydroperoxide, cumene hydroperoxide, p-menthane hydroperoxide, di-tert. butylhydroperoxide, keton peroxides such as cyclohexanone peroxide, percarbonates, combinations of the peroxides with amines, such as dimethyl-p-toluidine, diethanolamine, triethylenetetramine or metal compounds such as cobalt naphthenate. Peroxides, whose half life period below 100° C. is below 10 hours, are of preferred interest as polymerization initiators.

Suitable as water-soluble initiators are for example persulphates, especially alkali metal persulphates such as potassium persulphate, possibly in combination with reducing agents, such as pyrosulphites, formaldehyde sulphoxylate, triethylamine and others.

The initiators referred to above are usually employed in quantities from 0.1 to 5% by weight, calculated on the total monomer quantity in the case of monomer-soluble initiators, and based on the total water quantity in the case of water-soluble initiators.

The polymerization temperatures depend on the initiator or initiator system which is used and are for example between 10 and 100° C., and even higher than 100° C. when using high pressures. It is preferred to select temperatures between 25 and 80° C. or the polymerization is started in this temperature range and it is completed at temperatures above 80° C.

The process of the present invention is suitable both for preparing polymers and copolymers which are not cross-linked and also those which are cross-linked. After removing the water contained in the polymer, highly porous compositions are obtained. They can for example be used as insulating materials with thermal stability, hardness and water resistance values which can be adjustable within wide limits. The polymers can also serve as starting material for the production of exchanger compositions or fillers. The undried polymers feel dry and can serve for air-conditioning rooms or for keeping plants fresh. The reversed emulsions can also be poured into hollow molds and be polymerized therein, whereby shaping or reinforcing effects can be obtained. The dried and shredded polymers are suitable as absorption agents and supports for active substances. Furthermore, they are suitable for the manufacture of injection molding compositions.

The possibility of being able to influence the pore structure and also the drying and strength properties of the polymers and the shrinkage thereof is of great interest. This can be successfully achieved by adding varying quantities of maleic acid semi-esters or other substances which influence the stability of the reversed demulsion and as such there are also to be considered fillers such as sawdust, chalk and the like.

The parts indicated in the following examples are parts by weight unless otherwise mentioned.

Example 1

1000 parts of polyethylene oxide of molecular weight 1500 are dissolved in 500 parts of tert. butanol and heated in a nitrogen atmosphere in an autoclave to 120° C. Over a period of 1 hour, a solution of 500 parts of tert. butanol, 600 parts of styrene and 11 parts of benzoyl peroxide is pumped in while stirring. Stirring is thereafter continued for another 20 hours at 120° C. The contents of the autoclave are separated into a liquid phase and a solid phase over a period of 2 hours at 60° C. The solid phase is extracted by boiling with methanol and, after filtering off, is thoroughly washed with methanol and dried. The oxygen content of the colourless polymer is 4.2%, the K-value is 28.7 and the polymer is compatible with polystyrene up to a concentration of 4.5%.

3 parts of the dried reaction product are dissolved with 1 part of azodiisobutyronitrile in 100 parts of styrene and emulsified with 700 parts of water to form a reversed emulsion. This is polymerized at 60° C., ground and dried. Pressed elements are produced from the polymer, and these are completely transparent and the softening point thereof according to Vicat is at 127° C.

Example 2

The procedure is exactly the same as in Example 1, but a mixture of 12 parts of α-methyl styrene and 76 parts of styrene is used instead of styrene in the production of the emulsifier having a reversing action.

Examples 3 to 18

(a) PREPARATION OF EMULSIFIER A

An autoclave was charged with 6000 parts of methanol
6000 parts of styrene
4000 parts of polyethylene oxide (molecular weight 1550)
20 parts of benzoyl peroxide
20 parts of dicumene peroxide This mixture was heated while stirring for 2 hours to 80° C. and thereafter for 10 hours to 120° C. After stirring in 12,000 parts of water and heating to 180° C. the mixture was poured out into a vessel with ice-water. The so obtained graft-polymer of reverse-emulsifying properties yields as a granulate, which is washed with methanol and water and thereafter dried.

(b) PREPARATION OF EMULSIFIER B

A procedure similar to that described under (a) was employed, however instead of the abovementioned polyethylene oxide of a molecular weight of 1550 such one having a molecular weight of about 3000 was applied.

(c) PREPARATION OF EMULSIFIER C

The preparation of emulsifier C likewise is performed in a manner as described under (a), but instead of the polyethylene oxide (molecular weight 1550) a copolymer of 90 parts ethylene oxide with 10 parts propylene oxide having a molecular weight 2400 was employed.

In the examples listed in the following table in each case first of all castable respectively brushable reversed emulsions were prepared, filled into forms and thereafter polymerized in a manner as described in detail in Example 1.

| Example No. | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|
| Vinylidene chloride |  |  |  |  |  |  |  | 30 |  |  |  |  |  |  |  |  |
| Vinyl acetate |  |  |  |  |  | 50 |  |  |  |  |  |  |  |  |  |  |
| Acrylonitrile |  |  |  |  | 100 |  |  |  |  |  |  |  |  |  |  |  |
| Methyl methacrylate |  |  |  | 94 |  |  |  | 50 |  |  |  |  |  |  |  |  |
| Styrene | 80 | 80 | 80 |  | 90 |  |  |  | 80 | 900 |  | 100 | 1,875 | 1,500 | 1,125 | 300 |
| Ethyl acrylate |  |  |  |  |  |  | 70 |  |  |  | 562 |  |  |  |  | 200 |
| Methyl acrylate |  |  |  |  |  |  |  |  |  |  | 562 |  |  |  |  | 100 |
| Divinyl benzene |  |  |  |  |  |  |  |  | 20 | 225 |  | 100 |  |  |  |  |
| Polyester ¹ mixture | 20 | 20 | 20 |  | 10 |  |  |  |  | 375 | 375 | 60 | 625 | 500 | 375 | 200 |
| Maleic acid anhydride |  |  |  |  |  |  |  |  |  |  |  | 100 |  |  |  | 45 |
| Emulsifier A | 7 |  |  | 6 |  | 8 | 6 |  | 6 | 75 | 75 | 20 | 125 |  |  |  |
| Emulsifier B |  | 7 |  |  | 7 |  |  |  |  |  |  |  |  | 100 | 38 |  |
| Emulsifier C |  |  | 7 |  |  |  |  |  |  |  |  |  |  |  | 38 |  |
| Azodiisobutyric acid dinitrile |  |  |  | 1 |  |  | 2 |  |  |  |  |  |  |  |  |  |
| Lauroyl peroxide |  |  |  |  | 1 |  |  |  |  |  |  |  |  |  |  |  |
| Benzoyl peroxide |  |  |  |  |  |  |  |  | 1 |  |  |  |  |  |  |  |
| Potassium persulphate | 2 | 2 | 2 |  |  | 1 |  | 1.5 |  | 30 | 30 | 3 | 50 | 40 | 30 | 16 |
| Sodium pyrosulphite | 1 | 1 | 1 |  |  | 1 |  | 0.8 |  | 30 | 30 | 3 | 50 | 40 | 30 | 16 |
| Sodium acetate | 3 | 3 | 3 |  |  |  |  |  |  | 60 | 60 |  | 100 | 80 | 60 | 30 |
| Water | 700 | 700 | 700 | 800 | 600 | 700 | 600 | 650 | 800 | 6,000 | 6,000 | 1,500 | 5,000 | 6,000 | 6,000 | 800 |
| Reaction temperature | 25 | 25 | 30 | 45 | 50 | 20 | 45 | 20 | 75 | 30 | 35 | 45 | 18 | 18 | 18 | 24 |
| Reaction time up to hardening | 12 | 20 | 20 | 15 | 20 | 15 | 25 | 24 | 15 | 28 | 20 | 25 | 30 | 30 | 30 | 24 |

¹ A mixture of 70 parts of (1) a polyester of 0.3 mole of maleic acid, 0.7 mole of phthalic acid and 1.0 mol of butane-diol-1,3 with (2) 30 parts of styrene.

In the foregoing examples hard and in some cases also elastic (Examples 10, 13, 18) materials with high water content are obtained.

We claim:

1. Process for polymerization of a polymerizable organic water-insoluble monomer containing at least one $CH_2=C<$ group which comprises forming a reversed emulsion comprising said monomer as the dispersion medium and water as the disperse phase in the presence of a graft copolymer which has been obtained by grafting a styrene hydrocarbon containing from 8 to 10 carbon atoms on to 10 to 500 percent by weight, calculated on the amount of said styrene hydrocarbon, of a water-soluble polyalkylene-oxide containing polyethylene oxide units and having a molecular weight of at least 300, said reversed emulsion containing 5 to 4,000 percent by weight of water, based on the total amount of monomer, and polymerizing said reversed emulsion with the aid of 0.1 to 5% by weight, calculated on the total monomer quantity, of a free radical forming substance.

2. Process according to claim 1, wherein as graft copolymers polymeric materials are employed which have been obtained by grafting a styrene hydrocarbon on to a water-soluble polyethylene oxide having a molecular weight of from 300 to 200,000.

3. Process according to claim 2 wherein as graft copolymers polymeric materials are employed which have been obtained by grafting styrene on to a water-soluble polyethylene oxide having a molecular weight of from 300 to 200,000.

4. Process according to claim 2 wherein as graft copolymers polymeric materials are employed which have been obtained by grafting a mixture of styrene containing from 8 to 10 carbon atoms with an alkylated styrene, said mixture containing at least 50% by weight of styrene.

5. Process according to claim 1, wherein said water-soluble polyalkylene oxide is a copolymer of at least 80 percent by weight of ethylene oxide and propylene oxide.

6. Process according to claim 1, wherein said free radical forming substance is an organic monomer-soluble peroxy compound.

7. Process according to claim 1, wherein said free radical forming substance is an inorganic, water-soluble peroxy compound.

8. Process according to claim 7, wherein said inorganic peroxy compound is employed in combination with a reducing agent being able to form a redox system with said inorganic peroxy compound.

9. Process according to claim 1, wherein said graft copolymer is applied in amounts of from 0.1 up to 20 percent by weight calculated on the monomer phase.

10. Process according to claim 1 wherein said polymerizable organic water-insoluble monomer containing at least one $CH_2=C<$ group to be polymerized in a reversed emulsion is polymerized in presence of unsaturated polyester containing polymerizable double bonds, the amount of said unsaturated polyester being within the range of 60 to 75 parts by weight per each 30 to 25 parts by weight of polymerizable organic water-insoluble monomer containing at least one $CH_2=C<$ group.

References Cited by the Examiner

UNITED STATES PATENTS 2,718,509  9/55  Lunsted _____ 260—33.2
3,058,940  10/62  Rees _____ 260—29.6

FOREIGN PATENTS 612,883  1/61  Canada.

JOSEPH L. SCHOFER, *Primary Examiner.*

WILLIAM H. SHORT, *Examiner.*